US008745310B2

(12) United States Patent
Nishihara et al.

(10) Patent No.: US 8,745,310 B2
(45) Date of Patent: Jun. 3, 2014

(54) STORAGE APPARATUS, COMPUTER SYSTEM, AND METHOD FOR MANAGING STORAGE APPARATUS

(75) Inventors: Toshiyuki Nishihara, Kanagawa (JP); Kazuyuki Date, Kanagawa (JP)

(73) Assignee: Sony Corporation, Tokyo (JP)

( * ) Notice: Subject to any disclaimer, the term of this patent is extended or adjusted under 35 U.S.C. 154(b) by 1673 days.

(21) Appl. No.: 12/003,889

(22) Filed: Jan. 3, 2008

(65) Prior Publication Data

US 2008/0177937 A1  Jul. 24, 2008

(30) Foreign Application Priority Data

Jan. 23, 2007   (JP) .................................. 2007-012608

(51) Int. Cl.
  *G06F 12/00*  (2006.01)
  *G06F 13/00*  (2006.01)
  *G06F 13/28*  (2006.01)

(52) U.S. Cl.
  USPC .................................. 711/103; 711/E12.008

(58) Field of Classification Search
  USPC ........................................... 711/103, E12.008
  See application file for complete search history.

(56) References Cited

U.S. PATENT DOCUMENTS

| 2001/0012222 A1* | 8/2001 | Terasaki ........................ 365/200 |
| 2002/0172081 A1* | 11/2002 | Mukaida et al. ............... 365/200 |
| 2003/0115414 A1* | 6/2003 | Tomita .......................... 711/114 |
| 2003/0145167 A1* | 7/2003 | Tomita .......................... 711/114 |
| 2004/0065744 A1* | 4/2004 | Shiraishi et al. ............... 235/492 |
| 2006/0053246 A1* | 3/2006 | Lee ............................... 711/100 |
| 2007/0101047 A1* | 5/2007 | Kamiya et al. ................ 711/103 |
| 2007/0124409 A1* | 5/2007 | Sibert ........................... 709/216 |
| 2007/0130441 A1* | 6/2007 | Wooten ......................... 711/203 |

* cited by examiner

*Primary Examiner* — Sheng-Jen Tsai
(74) *Attorney, Agent, or Firm* — Rader, Fishman & Grauer PLLC

(57) ABSTRACT

A storage apparatus includes a flash memory, a second memory for storing an address translation table, and a control section. The flash memory is formed of multiple pages, each having a spare area, and data are stored on a page-by-page basis. The control section has the functions of: saving the table to the flash memory; when writing/updating data, storing the user data, recording, in the table, a correspondence between a logical page address and an address of a page in which the data is stored, and storing information for identifying the corresponding logical page address in the spare area of the page; when the apparatus is started, detecting pages to which data was written after the most recent saving of the table; and scanning the spare area of each page detected and reproducing a state of the table as updated after the most recent saving to reconstruct the table.

18 Claims, 12 Drawing Sheets

STORAGE APPARATUS, COMPUTER SYSTEM, AND METHOD FOR MANAGING STORAGE APPARATUS

CROSS REFERENCES TO RELATED APPLICATIONS

The present invention contains subject matter related to Japanese Patent Application JP 2007-012608, filed in the Japanese Patent Office on Jan. 23, 2007, the entire contents of which are incorporated herein by reference.

BACKGROUND OF THE INVENTION

1. Field of the Invention

The present invention relates to a storage apparatus and a computer system including a non-volatile memory and a method for managing the storage apparatus.

2. Description of the Related Art

In recent years, flash memories have been attracting attention as storage media for a digital still camera, a portable computer device, or the like.

The flash memory is a semiconductor memory that uses tunneling or hot-electron injection to cause electrons to pass through a gate insulating film to be injected into a floating gate or a trapping layer so that a threshold of a cell transistor will be changed to store data. In the flash memory, a memory cell can be formed by one transistor using a stacked gate structure, a MNOS structure, or the like, and thus inexpensive and large-capacity memory can be achieved.

Meanwhile, the flash memory has a very slow programming speed, requiring hundreds of microseconds ($\mu$s) per cell. Moreover, since overwriting of data is not allowed, an erase operation needs to be performed before programming, and this takes as long as several milliseconds. Such a problem is dealt with by parallel processing for multiple memory cells.

A simple example of a structure of a NAND flash memory, which is a typical example of flash memory, is illustrated in FIG. 1.

In a flash memory 1, a group 2 of cells connected to the same word line, for example, is a unit by which writing and reading are performed at a time, and is called a page. Further, a cell array 3 composed of a plurality of pages is a unit by which erasure is performed at a time, and is called a block. The entire flash memory 1 is composed of a plurality of blocks.

Specifically, ISSCC 2002 Digest, p. 106, session 6.4, for example, describes a 1-Gb NAND flash memory with a page size of 2k bytes and an erasure block size of 128 kB. That is, in one memory array, a group of memory cells with a size of 128k bytes are erased in parallel, and the memory cells are programmed in parallel in units of 2k bytes, so that a programming transfer rate of 10 MB/s is achieved.

In general, each page of the NAND flash has a 64-byte spare area while having a 2k-byte storage area for user data, for example.

A system that uses the NAND flash is able to store various management data, such as parity bits, in this spare area. Writing to this spare area generally needs to be performed simultaneously with writing to the area for the user data, and these two areas are handled as a set.

One noteworthy limitation of the flash memory is that an upper bound of the number of times erasure can be performed is specified.

If the number of times erasure has been performed exceeds the upper bound after repeated rewriting to the same block, data storage in that block ceases to be guaranteed. The upper bound of the number of times erasure can be performed for the above NAND flash is one hundred thousand or less, for example.

With increasing miniaturization of memory cells, variations in the threshold of cell transistors have been increasing, and the operation margin has been deteriorating, resulting in the tendency for the upper bound of the number of times of erasure to decrease further.

Further, in recent years, there has been a tendency for the following new limitations to be placed on the NAND flash in particular, because of changes in internal structure and writing mechanism caused by the miniaturization.

First, a new limitation has been placed on the order in which the pages in the block are written.

Specifically, writing to the pages can be performed in a forward direction, from lower addresses to higher addresses, while writing in an opposite direction is prohibited. For example, once data is written to a certain page, writing of data to lower addresses in the same block is not permitted even when no data has been written to the lower addresses.

Secondly, multiple writing to a page has become difficult. That is, it has become difficult to write data to the same page at two separate times. Therefore, it is becoming difficult to use various techniques formerly used for management of the flash memory, such as marking some bits in the spare area before writing data to the page, or setting a flag in the spare area after data writing.

SUMMARY OF THE INVENTION

In recent years, the flash memory has been expected to substitute for hard disks in order to overcome the problems of hard disks, such as high power consumption, a long seek time, low shock resistance, and poor portability.

As described above, the flash memory, however, has a disadvantage of the inability to increase speed without increasing an access unit. Moreover, since data overwriting is not allowed, rewriting may not be achieved without erasure, and a block to be erased at the time of rewriting is significantly large. An erasure unit is tens times as large as the access unit, and this is a part of the general specifications of the flash memory, in which an erasure time is long and a disturbance occurs in cells not being selected at the time of writing.

In order to cope with such specifications of the flash memory and achieve high-speed rewriting, even of a small amount of data, a multisession storage system has been proposed.

In such a system, rewriting is achieved by writing updated data to a free space and invalidating original data.

More specifically, an address translation table for associating logical addresses with physical addresses on a page-by-page basis is used, and rewriting is achieved by changing the physical address of data concerned and writing the data to a free space in a storage medium.

For example, Japanese Patent Laid-open No. Hei 8-328762 describes the details of a management method in a multisession storage system using the address translation table. FIG. 2 shows one example.

In FIG. 2, reference numeral 10 indicates a flash memory, reference numeral 11 indicates a block, reference numeral 12 indicates a page area, reference numeral 13 indicates a page buffer, reference numeral 14 indicates an erased empty block, reference numeral 15 indicates a page area, reference numeral 16 indicates a spare area, and reference numeral 17 indicates the address translation table.

In the address translation table 17, logical page addresses (LPAs) can be used as indexes to acquire corresponding physical page address (PPAs), which are addresses in the flash memory of corresponding pages.

Suppose, for example, that writing to a logical page address "0x5502" is specified by a host. In this case, the address translation table is used to perform address translation on a page basis, and a physical page address "0x6B05" in the flash memory 10 is acquired. As a result, access to the corresponding page area 12 in the block 11 is carried out.

Meanwhile, in the case where this page is updated, an appropriate free page area in the flash memory to which data can be written directly is searched for. Suppose, for example, that the top page area 15 in the erased empty block 14 corresponding to a physical block address "0xAA" is selected as an appropriate page area to which the data is to be written. In this case, data in the page area 12 is updated and written to the page area 15 via the page buffer 13. At this time, the logical page address "0x5502" is remapped to a physical address "0xAA00" of the page area 15, and a relevant field in the address translation table 17 is updated accordingly.

The original data in the page area 12 is invalidated and allowed to remain therein for the time being.

When the data is written to the page area 15, the corresponding logical page address "0x5502" is simultaneously written to the spare area 16. As a result, the spare area 16 can be referenced to find a correspondence between the physical page address "0xAA00" and the logical page address "0x5502".

According to such management, high-speed writing and rewriting to any logical address can be achieved on a page basis as long as there is a free space in the flash memory. That is, an empty block convenient for writing may be searched for, and writing may be performed in the empty block sequentially starting with the top page thereof. Since erasure is not processed during this process, the number of times of rewriting for the flash memory can be reduced significantly, resulting in a prolonged life of the flash memory.

If data updating is performed repeatedly in such a system, resulting in accumulation of invalidated pages, a storage area of the storage will become short of free space. Therefore, a block including many invalidated pages is selected at an appropriate time, and the selected block is subjected to a recovery process.

Specifically, effective pages in the selected block are all copied to another block before erasing the selected block, corresponding physical addresses described in the address translation table are updated accordingly, and finally the selected block is erased. These operations may be performed while the storage apparatus is in a standby state or while the system is in an idle state. This contributes to concealing the overhead from an user.

In such a storage system, the address translation table 17 is commonly stored in a volatile RAM, such as a SRAM, in order to allow high-speed access. The address translation table 17 is backed up to the flash memory when power is turned off, and, upon power-up, is loaded again into the RAM and reconstructed.

When an instantaneous power interruption occurs, however, the table will be lost while such a backup copy does not exist, with the result that the correspondences between the logical addresses and the physical addresses are unknown. At this time, the system attempts to reconstruct the address translation table 17, and the reconstruction of the address translation table 17 is achieved by scanning spare areas of all pages in the flash memory 10.

That is, since the spare area of each page stores a corresponding logical page address, the correspondences between the physical page addresses and the logical page addresses throughout the entire flash memory 10 can be checked by scanning all the pages in the flash memory 10 in accordance with the physical page addresses.

Note that, when a data update has been performed, the same logical page address is described in the spare areas of both the page in which the original data is stored and the page in which the updated data is stored. In this case, historical information (e.g., a time stamp) used for determining which data is older may be described in the spare area along with the logical page address. A page in which a logical page address that is also described in another page and which has an older writing history than the other page is described can be identified as an invalidated page, and the correspondence between the logical address and the physical address described therein can be neglected. In such a procedure, a complete reconstruction of the address translation table 17 is achieved.

However, with the increased capacity of the flash memory, it takes an enormous amount of time to scan the spare areas of all the pages of the flash memory and perform the necessary processes. When the flash memory is 1 GB in size and is composed of 2-kB pages, for example, the number of pages is as large as 512 k. Since reading the spare area of each page needs approximately 50 microseconds, simply scanning all pages needs as long as 25.6 seconds. Moreover, it takes more than twice as long a time to reconstruct the table using limited RAM resources.

Therefore, after the power of the storage system is instantaneously interrupted as a result of a plug being removed from a receptacle, for example, the system may not be started even nearly one minute after power-up.

In the case of removable media, because removing the media by the user leads directly to an instantaneous power interruption, the instantaneous power interruption may occur frequently, meaning uselessness in such applications.

An advantage of the present invention is to provide a storage apparatus, a computer system, and a method for managing the storage apparatus, which enable reconstruction of the address translation table for a short time after an instantaneous power interruption, regardless of the capacity of storage.

According to one embodiment of the present invention, there is provided a storage apparatus including: a flash memory device as a main memory; a second memory for storing an address translation table; and a control section configured to control the flash memory device and the second memory. The flash memory device is formed of a plurality of pages, each of the pages having a spare area. Data is stored on a page-by-page basis. The control section has: a function of saving the address translation table within the second memory to the flash memory device as appropriate; a function of, when writing or update of user data is performed in accordance with a command, storing the user data in an appropriate free space within the flash memory device on a page-by-page basis, and, at this time, recording, in the address translation table, a correspondence between a logical page address based on an input address and an address of a page, in the flash memory device in which the user data is stored, and storing information for identifying the corresponding logical page address in the spare area of the page; a function of, when the storage apparatus is started, detecting at least a group of pages to which user data has been written since the most recent saving of the table; and a function of scanning the spare area of each of the group of pages and reproducing a state of the table as updated after the most recent saving of the table to reconstruct the table.

According to another embodiment of the present invention, there is provided a computer system including: a storage apparatus that includes a flash memory device as a main memory, a second memory for storing an address translation table, and a control section configured to control the flash memory device and the second memory; and a host processing apparatus capable of accessing data in the flash memory device. The flash memory device is formed of a plurality of pages, each of the pages having a spare area. Data is stored on a page-by-page basis. The control section has: a function of saving the address translation table within the second memory to the flash memory device as appropriate; a function of, when writing or updating of user data is performed in accordance with a command from the processing apparatus, storing the user data in an appropriate free space within the flash memory device on a page-by-page basis, and, at this time, recording, in the address translation table, a correspondence between a logical page address based on an address inputted from the processing apparatus and an address of a page, in the flash memory device in which the user data is stored, and storing information for identifying the corresponding logical page address in the spare area of the page; a function of, when the storage apparatus is started, detecting at least a group of pages to which user data has been written since the most recent saving of the table; and a function of scanning the spare area of each of the group of pages and reproducing a state of the table as updated after the most recent saving of the table to reconstruct the table.

According to yet another embodiment of the present invention, there is provided a method for managing a storage apparatus including a flash memory device as a main memory and a second memory for storing an address translation table. The method includes the steps of: allowing the flash memory device to be formed of a plurality of pages each having a spare area, data being stored on a page-by-page basis; when writing user data corresponding to a specific logical page address to the flash memory device, storing the user data in an appropriate free space within the flash memory device on a page-by-page basis; when storing the user data on a page-by-page basis, recording, in the address translation table, a correspondence between the logical page address and an address of a page, in the flash memory device in which the user data is stored; storing information for identifying the corresponding logical page address in the spare area of the page; saving the address translation table within the second memory to the flash memory device as appropriate; when a system is started, detecting at least a group of pages to which user data has been written since the most recent saving of the table; and scanning the spare area of each of the group of pages and reproducing a state of the table as updated after the most recent saving of the table to reconstruct the table.

According to an embodiment of the present invention, when writing or updating of user data is performed in accordance with a command sent from a host, for example, under the control of the control section, the user data is stored in an appropriate free space within the flash memory on a page-by-page basis.

At this time, the correspondence between the logical page address based on the address inputted from the host and the address of the page in the flash memory in which the user data is stored is recorded in the address translation table, and the information for identifying the corresponding logical page address is stored in the spare area of the page.

Further, the address translation table within the second memory is saved to the flash memory device as appropriate.

When the storage apparatus is started, at least a group of pages to which user data was written after the most recent saving of the table is detected, and the spare areas in the detected group of pages are scanned to reproduce the state of the table as updated after the most recent saving of the table, whereby complete reconstruction of the table is achieved.

According to the an embodiment of the present invention, regardless of the capacity of the storage, the reconstruction of the address translation table is achieved for a very short time after the occurrence of an instantaneous power interruption. For example, the storage apparatus can be restarted in less than five seconds.

Therefore, an user is seldom obliged to wait for a long time for the system to restart after the occurrence of the instantaneous power interruption. In addition, the storage apparatus can be used as a removable medium without a problem.

DETAILED DESCRIPTION OF THE PREFERRED EMBODIMENTS

Hereinafter, embodiments of the present invention will be described in conjunction with the accompanying drawings.

Figure 1:
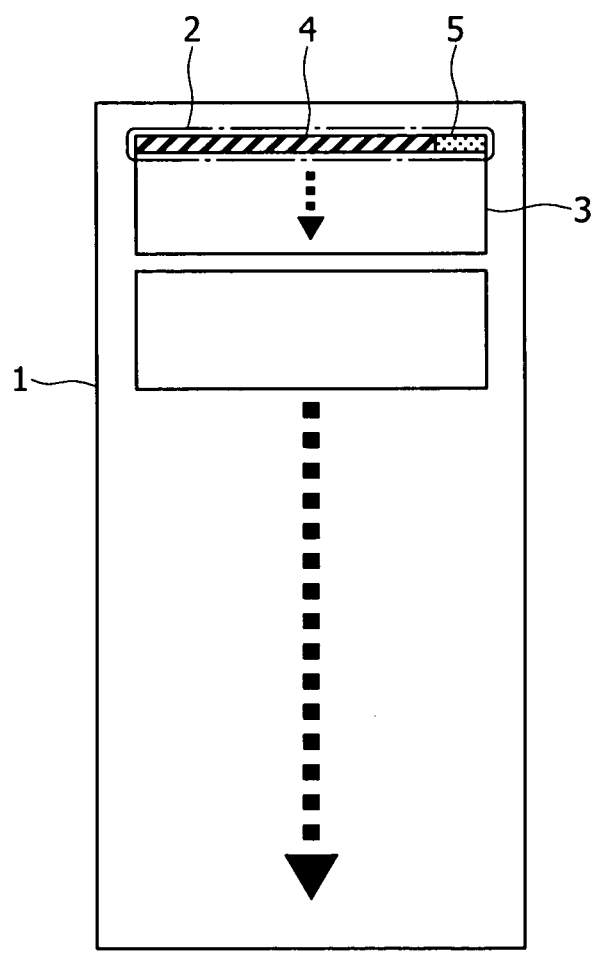
FIG. 1 shows an exemplary internal structure of a NAND flash memory.
Figure 2:
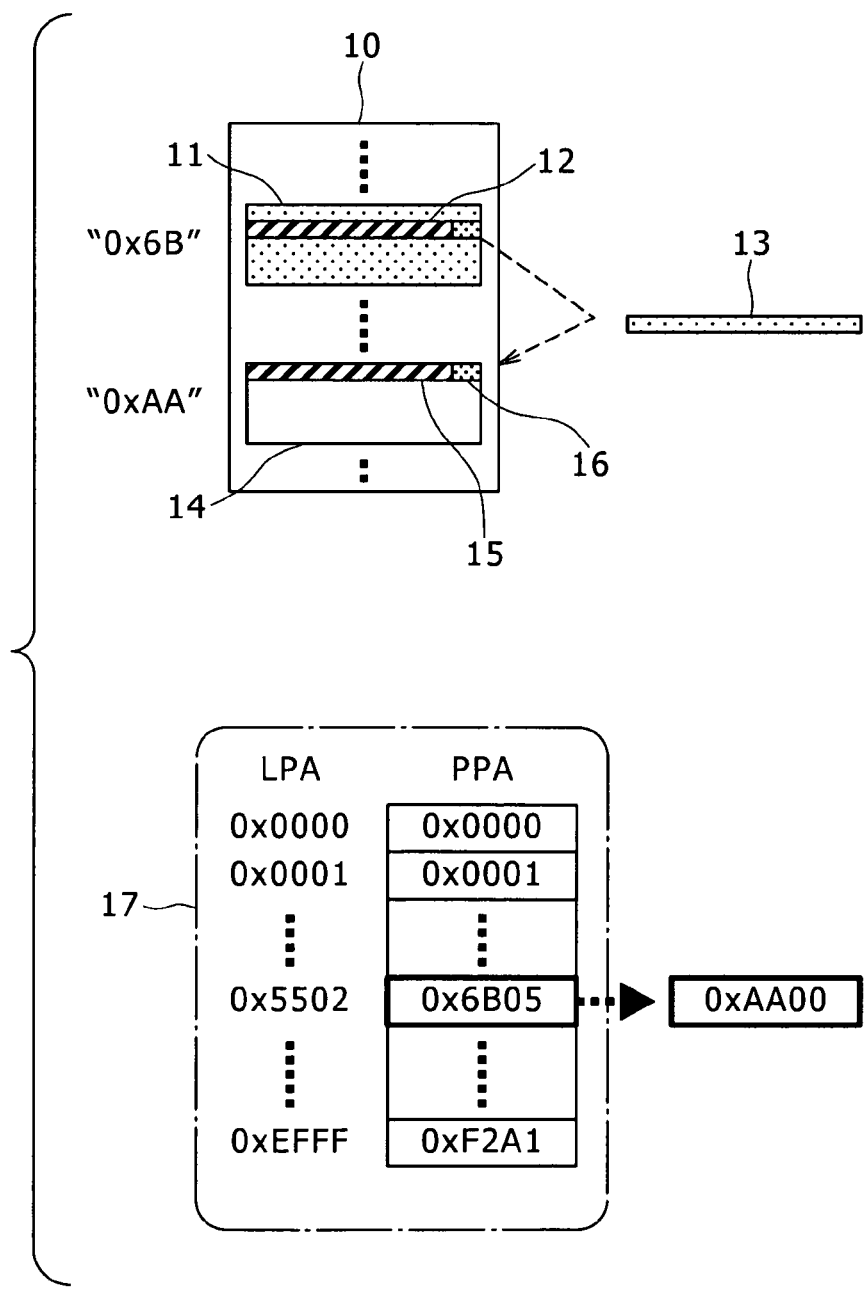
FIG. 2 illustrates a procedure for writing and remapping in a flash memory.
Figure 3:
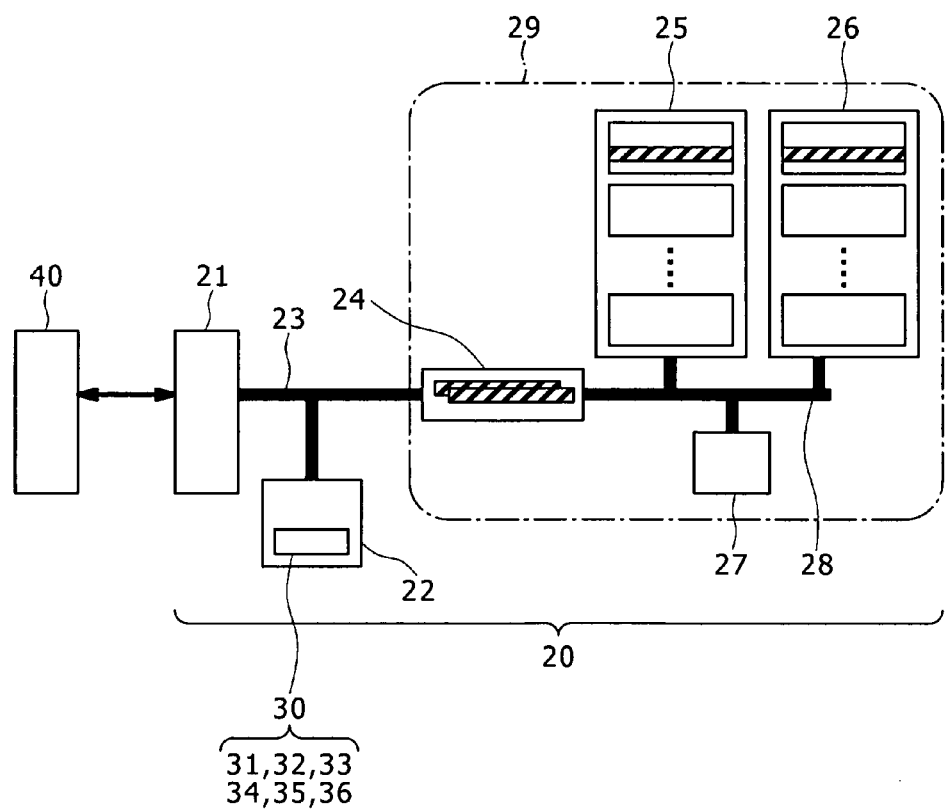
FIG. 3 shows an exemplary structure of a computer system that adopts a storage apparatus according to one embodiment of the present invention.

FIG. 3 shows an exemplary structure of a computer system that adopts a storage apparatus according to one embodiment of the present invention.

This computer system COMSYS has, as its primary components, a storage apparatus 20 and a host system (a processing apparatus) 40.

The storage apparatus 20 includes an interface circuit (I/F) 21, a control circuit 22, an internal bus 23, a page buffer 24, NAND flash memories 25 and 26, a control circuit 27, and a memory bus 28.

The control circuit 22 includes a RAM 30 as a second memory. The RAM 30 is provided with a working area 31, in which an address translation table 32, a search table 33, a write pointer 34, and a loop counter 35 are constructed.

The host system 40 includes a CPU, a RAM, a ROM, a system bus, and so on.

Inside the storage apparatus 20, the two chips of 8 Gb NAND flash memories (sometimes referred to as "flash memory chips") 25 and 26, having 16-bit input/output, are connected in parallel to the 32-bit memory bus 28. These two chips are accessed concurrently at the time of reading and writing. That is, the memory bus 28 is configured to have two channels of 16-bit buses. Each of the flash memories performs write or read access on a page-by-page basis, with each page having a size of 4 kB, for example. Therefore, an actual page size is 8 kB, and data of 8 kb is accessed at a time.

The page buffer 24 temporarily stores the data of a page area accessed. The exchange of data between the flash memories 25 and 26 and the page buffer 24 is controlled by the control circuit 27.

Further, the control circuit 27 performs, as necessary, error correction on transferred data in accordance with ECC encoding. Both the flash memories 25 and 26 input and output data from or to the internal bus 23 of the storage apparatus via the page buffer 24.

That is, in essence, as a group of circuits, the page buffer 24, the NAND flash memories 25 and 26, the control circuit 27, and the memory bus 28 can be considered to combine to form a single flash memory device (sometimes referred to as a "flash memory module") 29 and can be connected to the internal bus 23 of the storage apparatus 20. A total capacity thereof is 16 Gb (2 GB), and the actual page size is 4 kB. Therefore, 512k pieces of page data are stored in the apparatus.

Further, the interface circuit 21 and the control circuit 22 are connected to the internal bus 23.

The interface circuit 21 exchanges data or commands with the host system 40 in accordance with ATA, PCI Express, or other standards.

The control circuit 22 contains a CPU and, in accordance with a control program, manages the exchange of the data between the page buffer 24 and the interface circuit 21 within the storage apparatus.

The RAM 30 contained in the control circuit 22 is provided with the working area 31 or a code area for executing the control program. The address translation table 32 for managing page-based virtual addresses, the search table 33 for searching for a failure-free empty block, the write pointer 34, the loop counter 35 for the write pointer 34, and so on are constructed therein.

In this computer system COMSYS, the host system 40 is controlled by the CPU contained therein, and stores user data in the flash memory device 29 via the storage apparatus 20 in response to a request from an application or an operating system (OS).

The control circuit 22 intervenes in this data exchange, and performs access management involving address translation using the address translation table 32.

In the storage apparatus 20, as in hard disks, 512-byte sectors are access units.

For the sake of simplicity, it is assumed that hexadecimal addresses are allocated as follows in the storage apparatus.

In the case where an address inputted from an outside is "0x05502C", for example, a high-order 24 bits "0x05502" is a page address, and a maximum of 1M pages are manageable. Meanwhile, a low-order 4 bits "0xC" is a sector address within a page area, and 16 sectors are contained in each page.

This storage apparatus is capable of sector-based random access by selecting the data in the page buffer 24.

Hereinafter, an internal operation of the storage apparatus 20 will be described.

In the present embodiment, virtual address management on a page-by-page basis is adopted.

Figure 4:
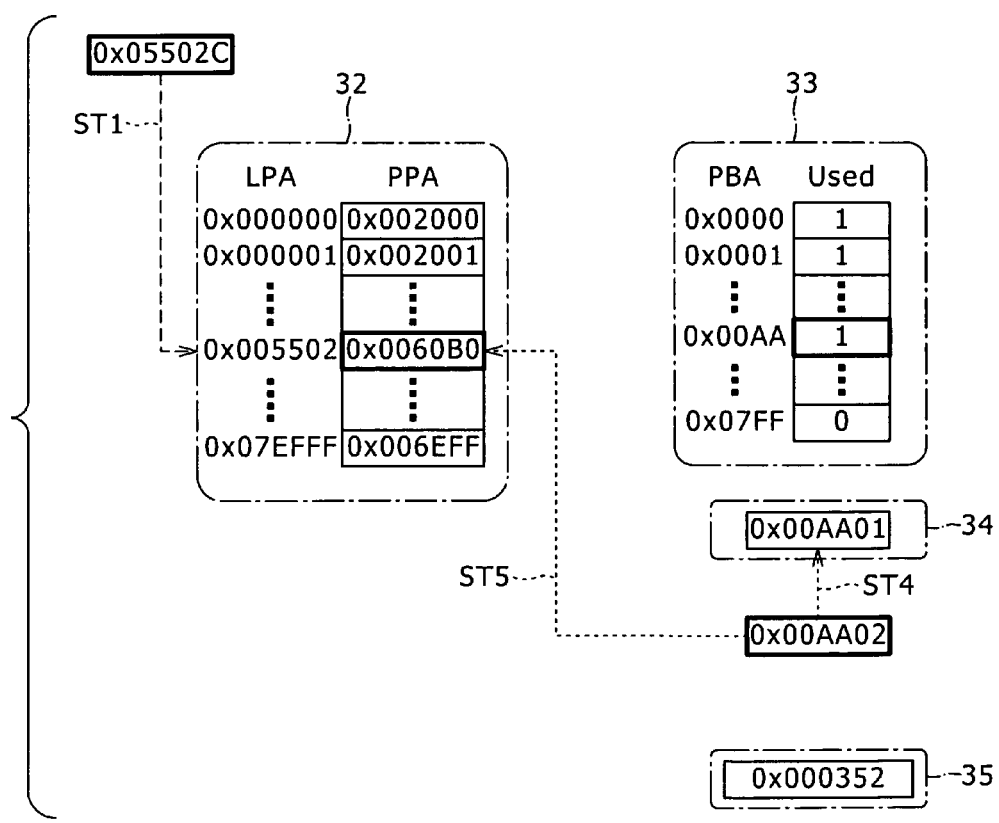
FIG. 4 shows exemplary structures of an address translation table and a search table.
Figure 5:
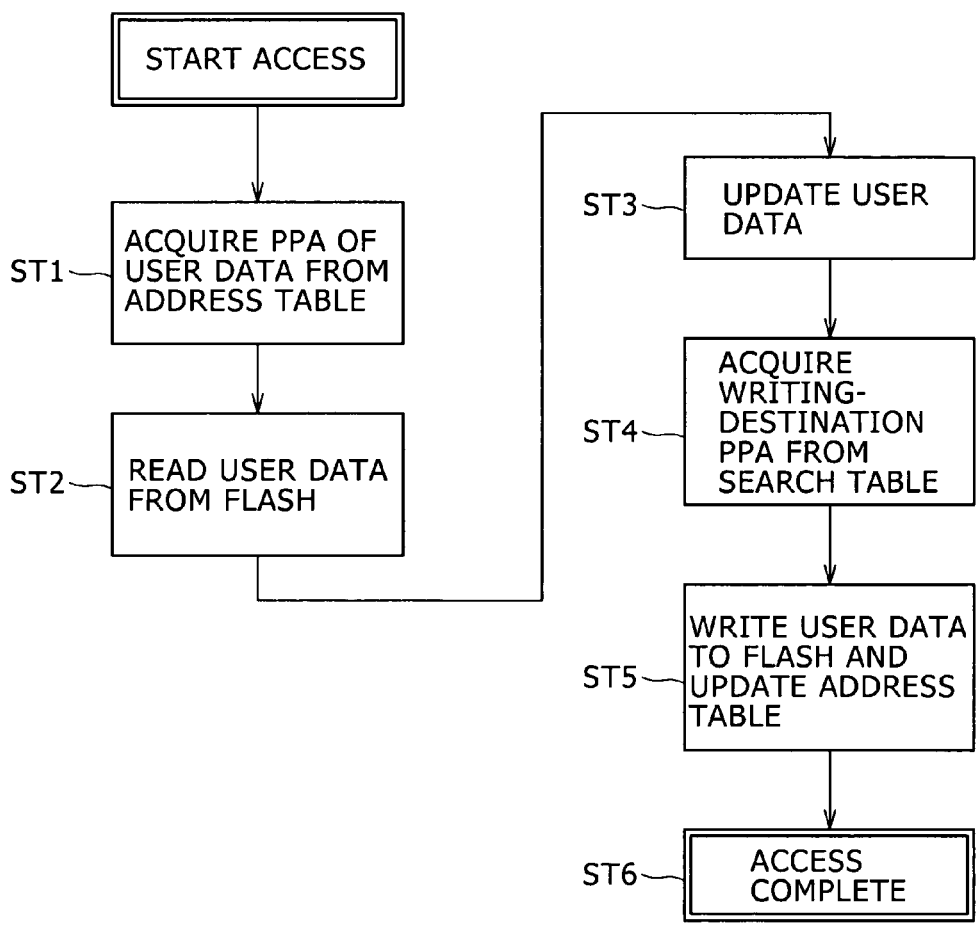
FIG. 5 is a flowchart illustrating a specific procedure for accessing to a flash memory device inside the storage apparatus.

FIG. 4 shows exemplary structures of the address translation table 32 and the search table 33. FIG. 5 shows a flow of data access using such tables. Specific access to the flash memory device 29 inside the storage apparatus 20 is performed in the following procedure as illustrated by a flowchart of FIG. 5.

[Operation of Reading Data]
Step ST1:
If a command for access to user data is inputted from the host system 40 together with the sector address "0x005502C", the control circuit 22 refers to the address translation table 32 using "0x005502" in a logical page address portion (LPA) as an index, and acquires a physical page address PPA "0x0060B0" of the user data to be accessed.
Step ST2:
The flash memory device 29 is accessed at the above physical page address, and a page group in which the user data is stored is read out to the page buffer 24. Thereafter, a portion corresponding to the sector address "0xC" is selectively outputted from the page buffer 24 to the host, and the reading operation is completed.

Data updating is performed in the following procedure. It is assumed that the same sector at "0x005502C" is to be updated.
[Operation of Updating (Writing) Data]
Steps ST1 and ST2:
As in the reading operation, the desired data is read from the flash memory device 29 and stored in the page buffer 24.
Step ST3:
The portion of the data corresponding to the desired sector is updated in the page buffer.
Step ST4:
A physical page address PPA of an appropriate page area is selected from the search table 33 and the write pointer 34, which reside in the RAM 30, as an address of a page in the flash memory device 29 to which the user data updated is to be written.

The above procedure will be described in detail below. For the sake of simplicity, it is assumed here that the physical page address is composed of a physical block address portion (PBA) of high-order 16 bits and a page offset portion of low-order 8 bits. In this case, each erasure block is composed of 256 ($2^8$) pages.

In the search table 33, an "Used" flag is used to mark whether each block is currently in use or in an empty (erased) state on a block-by-block basis.

First, the write pointer 34 circulates among addresses, moving from lower to higher addresses, in the search table 33 in accordance with the increment of the physical block address portion, searching for a fine, erased block. Once a destination block is detected, an "Used" flag therefor is set to "1" in the search table 33, and a top page thereof is first selected as the writing destination.

From here onward, writing-destination pages are selected sequentially, from lower to higher addresses, in accordance with the increment of the page offset portion. If selection reaches an end of the block, a next unused and fine block is searched for in accordance with the increment of the physical block address portion again.

In such a manner, the write pointer 34 circulates among the addresses in the flash memory device 29. Then, when a block at the last address in the search table 33 is reached and further the last page therein is reached, the loop counter 35 is incremented by one and selection returns to the top address.

A current value of the write pointer 34 is "0x00AA01", and therefore, the control circuit 22 first selects a physical page address "0x00AA02" as the writing destination of the user data.

Step ST5:

The flash memory device 29 is accessed at the above physical page address, and the user data within the page buffer 24 is written to the flash memory device 29 at a time.

At the same time, a counter value of the loop counter 35, "0x000352", and the logical page address of the data, "0x005502", are written to a redundant portion of the page area. The counter value of the loop counter 35 indicates a history of data writing to the pages. By comparing counter values written in different pages, it is possible to determine which of the data in the different pages was written earlier. Meanwhile, the logical page address of the data is written thereto in order to allow acquisition of the correspondence between the physical page address and the logical page address. Both the counter value of the loop counter 35 and the logical page address of the data are used for reconstruction of the address translation table 32 when the address translation table 32 has been lost.

Upon the completion of data writing, the address translation table 32 is updated. That is, the physical page address PPA corresponding to the logical page address LPA "0x005502" is updated to "0x00AA02".

Meanwhile, the page area corresponding to the former physical page address "0x0060B0" is invalidated.

When the above-described multisession writing has been performed, the page area corresponding to the physical page address "0x0060B0" at which the preupdated data is stored is deleted from a physical address field in the address translation table 32, and is made inaccessible from the outside, i.e., invalidated.

However, the data is still stored in the page area, and the page area, in the current state, is not usable as a free space. Multiple performances of rewriting as described above will result in a large number of invalidated page areas. Such invalidated page areas need to be erased for recovery so that they can be used as free spaces again. At this time, other effective data stored in a block "0x0060" to be erased need be saved to another location.

Such a recovery process may be performed as follows. For example, the effective data in the block concerned is first read out to the page buffer at the time of updating, and then written to a free space in another block. In such a manner, a substantial saving of the effective data can be achieved. That is, an effective page(s) is provisionally updated, and an entire original area is invalidated. Thereafter, the block concerned is erased to complete the recovery process.

Figure 6:
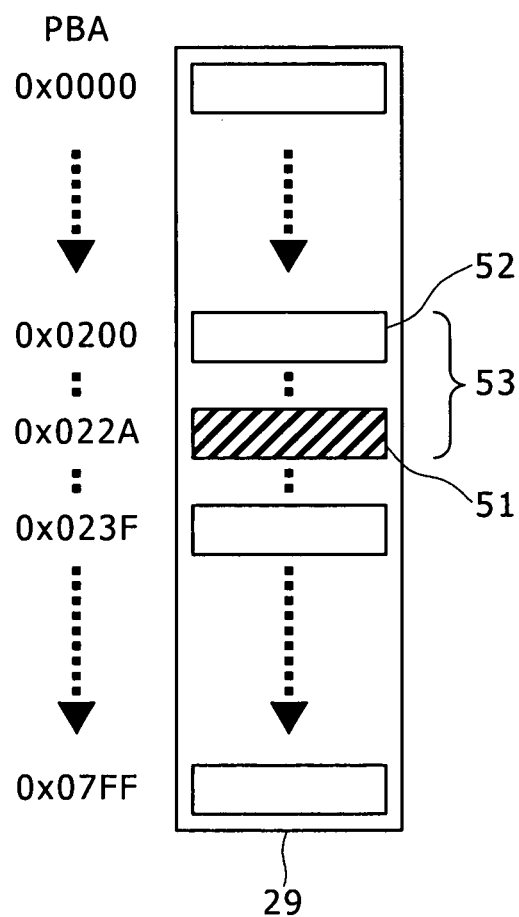
FIG. 6 is a conceptual diagram of a memory when the table is reconstructed in a first embodiment of the present invention.
Figure 7:
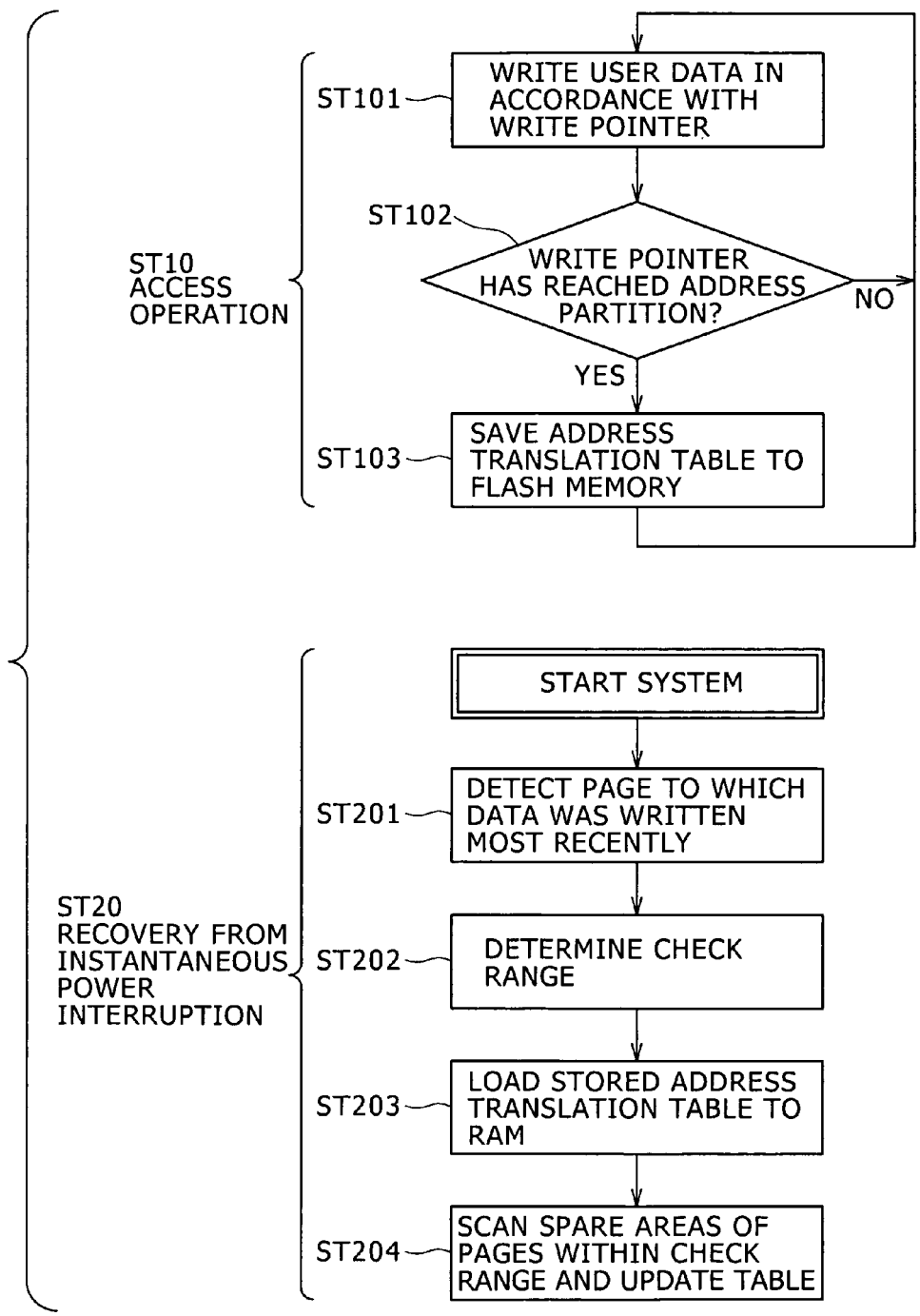
FIG. 7 is a flowchart illustrating a procedure for reconstructing the table in the first embodiment.

In the above-described storage apparatus 20, the address translation table 32 is constructed within the RAM 30, and if an instantaneous power interruption occurs, the address translation table 32 is lost. A method for quickly recovering the address translation table 32 as introduced by the present embodiment now will be described below in conjunction with a conceptual diagram of FIG. 6 and a flowchart of FIG. 7. The examples of the structures of the tables as illustrated in FIG. 4 are also applied here.

Step ST10: Process During Regular Access Operation

Backup of the address translation table 32 to the flash memory device 29 is performed based on the progress of the write pointer 34.

Step ST101:

Writing of the user data is performed in accordance with the progress of the write pointer 34. The write pointer 34 scans the physical block addresses PBA within the search table 33 sequentially while searching for an empty block, thereby circulating among the physical page addresses.

Here, partitions are provided among the physical block addresses PBA, which range from "0x0000" to "0x07FF", so that each pair of partitions enclose 64 physical block addresses. That is, the partitions are provided on block addresses "0x0000", "0x0040", "0x0080", . . . , "0x0780", and "0x07C0".

Steps ST102 and ST103:

Each time the write pointer 34 reaches one of the partitions, a backup of the address translation table 32 in the RAM 30 is saved to the flash memory device 29. Such a backup of the address translation table 32 may either be saved into a block at a predetermined address PBA, or a block for storing the backup may be dynamically secured in accordance with the write pointer so that the backup is saved into that block. In the latter case, the necessary number of blocks for storing the backup are dynamically secured, starting with the first empty block subsequent to the above partition.

Note that when the address translation table 32 has not been updated since the previous backup, the saving of the backup as described above can be omitted.

Step ST20: Recovery from Instantaneous Power Interruption;

Step ST201:

When the system is restarted after the occurrence of the instantaneous power interruption, the spare area of a top page of each block is scanned first. A used block whose top page has the spare area that stores the greatest value of the loop counter 35 and whose address PBA is most rearward can be identified as a block to which data was written most recently. Further, in this block, a page at the highest address of all pages that store data is a page to which data was written most recently.

Step ST202:

Suppose that an address of a block 51 thus identified as the block to which data was written most recently is "0x022A". In this case, it is found that the most recent backup of the address translation table 32 was saved when the write pointer reached a block 52 at "0x0200".

Therefore, pages to which data were newly written after the most recent backup of the address translation table 32 exist within a block range 53 and not outside of this range. More specifically, a page(s) that exists within this range and whose spare area stores the value of the loop counter 35 equal to the greatest value at ST201 described above can be identified as a page to which data was written after the most recent backup.

Step ST203:

The most recent backup of the address translation table is loaded into the RAM.

Step ST204:

The spare area of each page in the range 53 is scanned sequentially. A page(s) to which data was written after the most recent backup is identified in the above-described manner based on the value of the loop counter 35 described in the spare area, and based on the value of the logical page address described in the spare area, the correspondence between the physical page address and the logical page address is acquired to allow that correspondence to be reflected in the table in the RAM. Thus, the newest address translation table is reconstructed.

Note that a group of pages in the same block have the same value of the loop counter 35 described therein. Therefore, if the top page in a block is not identified as a page to which data was written after the most recent backup, the check of the remaining pages in that block may be skipped.

In known techniques, the entire table is newly reconstructed from the start, and therefore, the pages throughout the flash memory device need to be scanned and checked for the address correspondences. Therefore, in the case of this hardware configuration, all of the 2k blocks, i.e., 512k pages, need be scanned, which needs tens of seconds of scanning time.

In contrast, in accordance with the present embodiment, a maximum of 64 blocks, i.e., a maximum of 16k pages, need to be scanned, which needs less than one thirty-second of the scanning time in the known techniques. Thus, the scanning time is reduced to less than one second, allowing instantaneous recovery.

In the above-described example, address boundaries are set previously on a route over which the write pointer 34 moves, and backup is performed based on the address boundaries, and thus it is made possible to identify the location of the write pointer when the most recent backup was performed. This further makes it possible to identify the group of pages to which data was newly written after the most recent backup. This technique is simple and easy to implement, but there is a variety of possible methods to identify the group of pages to which data was written after the most recent backup.

For example, at the time when the backup of the address translation table 32 is saved, the value of the write pointer at the time may be stored in a free space, the spare area of a page, or the like in the block in which the backup is saved. In this case, a range starting with the stored value of the write pointer and ending with a page to which data was written most recently may be determined to be a check range, and the spare area of each page in this range may be scanned. This makes it easy to identify the page(s) to which data was written after the backup.

Alternatively, the backup of the address translation table 32 may be saved each time data has been written to a predetermined number of blocks. In this case, the value of the write pointer may be stored when the backup of the table is saved as described above, and thus the check range can be determined.

Suppose that the block to which data was written most recently has been identified. Then, the group of pages to which data was written after the most recent backup necessarily exists within a range of the predetermined number of blocks ending with the block to which the data was written most recently. Thus, this range can be scanned to check the spare area of each page in this range to reproduce the address translation table.

Note here that the operation of saving the backup of the address translation table is overhead for the regular operation of writing data. Therefore, if the amount of the backup is large and backup is performed frequently, this may contribute to deteriorating access performance of the storage apparatus.

For example, suppose that, in the address translation table 32 of FIG. 4, 4-byte fields are provided each for storing one of the physical addresses corresponding to the logical addresses of the 512k pages. Then, the total size thereof reaches 2 M bytes. Accordingly, the storage thereof results in the consumption of two blocks in the flash memory device 29. Here, if a backup of the entire table is saved each time the write pointer moves across 64 blocks, the overhead is too great to be neglected.

In contrast, a management method of storing the address translation table within the flash memory normally and, when necessary, loading a part of the address translation table into the RAM contributes to economizing the capacity of the RAM and overcoming the above problem. Thus, this management method is well suited to the application of the present invention.

Thus, a second embodiment of the present invention that incorporates this management method will now be described below.

In the second embodiment, the address translation table is divided into a plurality of subtables, and the subtables are stored within the flash memory device while some of the subtables are loaded into the RAM as necessary.

For example, the above-described table, having a size of 2 M bytes, may be divided into 1k subtables, each corresponding to logical addresses of 512 pages. In this case, each of the subtables has a size of 2 kB and can be contained in one page in the flash memory device 29. Therefore, a backup of the subtable is achieved by writing to one page, and is achieved instantly, for less than 1 millisecond.

Figure 8:
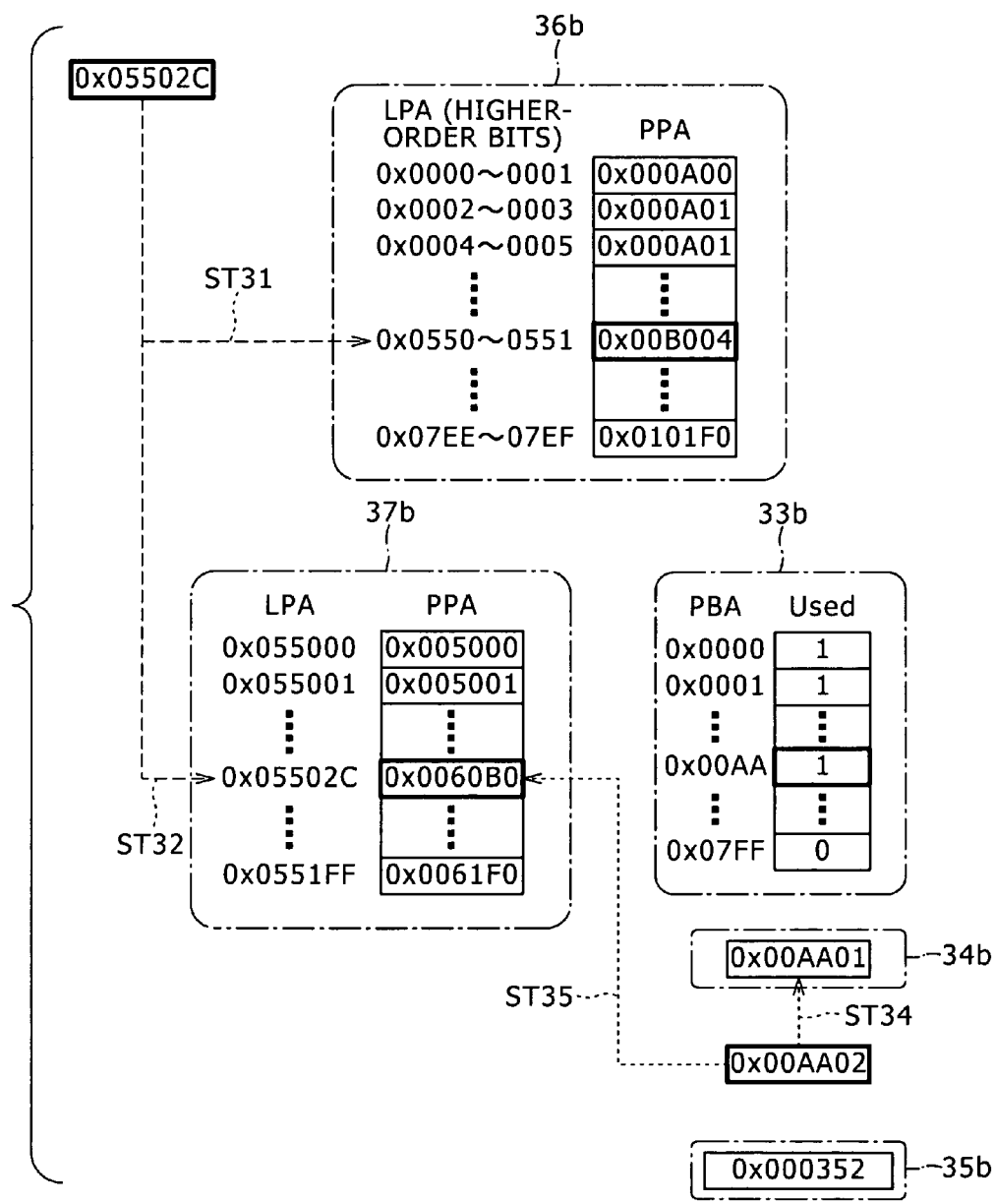
FIG. 8 illustrates an example of the management of an address translation table according to a second embodiment of the present invention, in which the address translation table is divided into subtables.

FIG. 8 illustrates an example of the management of the address translation table in which the address translation table is divided into the subtables.

A table list 36b represents the location of each subtable in the flash memory and resides in the RAM. In the table list 36b, higher-order bits of the logical page address LPA are used as an index to indicate the physical page address PPA of a block in which a corresponding subtable is stored in the flash memory device.

The 1k subtables are classified into eight groups, each composed of 128 subtables, and one separate block in the flash memory device is used for storing each group of subtables. That is, the 128 subtables that constitute one group are stored in the same block and share the same physical block address PBA as storage location information. Therefore, a field actually prepared for each subtable needs to be a page offset POFF within the block. This corresponds to low-order 8 bits of the physical page address PPA, and the total size thereof within the table list 36b is as small as 1k bytes. That is, the total size of the table list 36b, which resides in the RAM, is as small as a little more than 1k bytes.

An user access is performed in the following procedure. It is assumed here, for example, that user data at the logical page address "0x05502C" is to be accessed.
[Operation of Reading Data]
Step ST31:

First, the location at which a desired subtable is stored is acquired from the table list 36b using the higher-order bits of the logical page address "0x0550" as an index. Here, a corresponding physical page address "0x00B004" is acquired, and the flash memory device is accessed based on this physical page address, so that a subtable 37b is loaded to the RAM.
Step ST32:

Further, a page at which the desired user data is stored is acquired from the subtable 37b using the logical page address "0x05502C" as an index. Here, the corresponding physical page address "0x0060B0" is acquired, and the flash memory device is accessed based on this physical page address, so that the user data is read.

A data update is performed as follows. It is assumed here that a sector at the same address "0x005502C" is to be updated.
[Operation of Updating (Writing) Data]
Steps ST31 and ST32:

According to the same procedure as in the operation of reading data, the subtable 37b is read from the flash memory device and stored in the RAM, and the desired user data is read from the flash memory device and stored in the page buffer.

Step ST33:

A portion of the user data corresponding to the desired sector is updated in the page buffer.

Step ST34:

A physical page address PPA of an appropriate page area is selected from a search table 33b and a write pointer 34b, which reside in the RAM as an address of a page in the flash memory device to which the updated user data is to be written. The procedure of searching at this time is similar to that described above with reference to FIG. 4.

Step ST35:

The flash memory device is accessed at the above physical page address, and the user data updated in the page buffer is written to the flash memory device at a time. At the same time, a counter value "0x000352" of a loop counter 35b and the logical page address "0x005502" are written to the redundant portion of the page area.

After this writing is completed, the subtable 37b is updated in the RAM so that the physical page address PPA corresponding to the logical page address LPA "0x005502" is updated to "0x00AA02". Meanwhile, the page area corresponding to the former physical page address "0x0060B0" is invalidated.

Note that such a subtable in the RAM is used as a cache of the table. That is, when the next user access is performed on the storage apparatus, if an index of a subtable acquired from the logical page address is the same as in the previous access, the subtable in the RAM can be used again.

Meanwhile, in the case where a different subtable is necessary, a new subtable needs to be loaded from the flash memory device into the RAM while discarding the former subtable. At this time, if the former subtable has been updated, the former subtable as updated needs to be stored in the flash memory device before loading the new subtable.

Alternatively, a plurality of subtables may be stored in the RAM as cache entries so that, if any of the subtables is usable in the user access, the usuable subtable may be used. In the case where none of the subtables is usable and the addition of a new cache entry is not available, the order of priority of the subtables as the cache entries is determined based on whether or not they have been updated, the number of times they have been accessed, the order in which they were loaded into the RAM, or the like, and one of the subtables is selected and discarded. At this time, if the selected subtable has been updated, the updated version thereof is stored in the flash memory device. Thereafter, the desired subtable is loaded from the flash memory device, registered as a new cache entry, and stored in the RAM.

Figure 9:
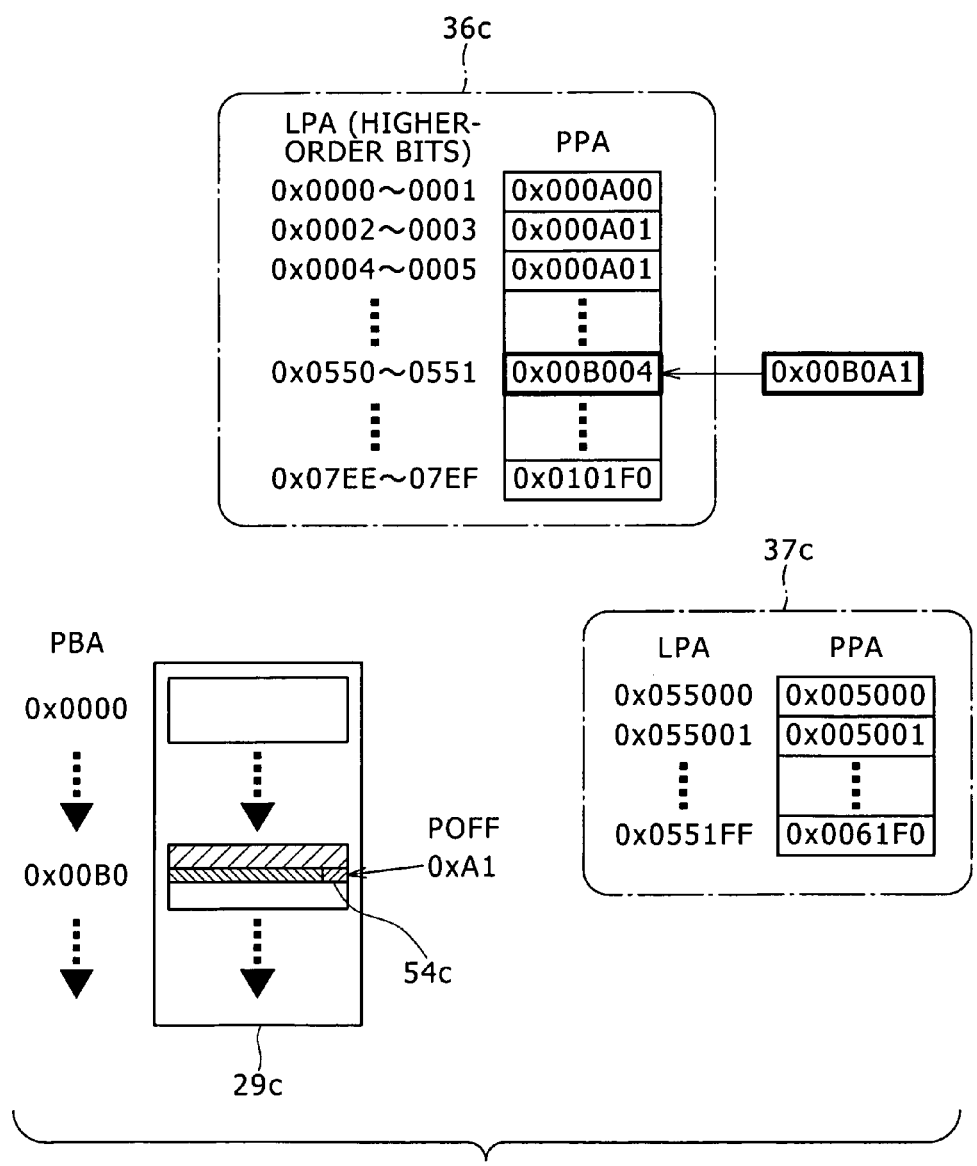
FIG. 9 illustrates a procedure for saving the subtable to the flash memory in the second embodiment.

The storage of the subtable into the flash memory device as described above is performed in a manner as illustrated in FIG. 9.

Referring to FIG. 9, it is assumed here that a subtable 37c loaded into the RAM is updated and stored into a flash memory device 29c.

Higher-order bits of logical page addresses that are indexes in the above subtable are "0x0550 to 0x0551", and a former location thereof is described in a table list 36c. This is stored in a block at a physical block address PBA "0x00B0" together with other subtables that belong to the same group, and stored in a page corresponding to an offset value POFF "0x04".

Because each block has 256 pages, the block affords the capability of storing twice as much as the corresponding group of subtables. When a backup of the updated subtable is saved, the backup is written to the lowermost empty page in the corresponding block, and the table list 36c is updated accordingly. Here, an offset value POFF of the lowermost empty page in this block is "0xA1", and therefore the updated subtable is stored into this page. Thereafter, the physical page address corresponding to the corresponding logical page address in the table list 36c is changed to "0x00BOA1".

As a result, data of the subtable before update are invalidated, and re-storage of the subtable is completed quickly by writing to one page. If subtables have been written to all the 256 pages in the block, a new block is secured and an effective page(s) is copied to the new block.

When the subtable is stored, an index value for identifying the subtable is written to a spare area 54c of the page to which the subtable is stored. For this index value, the index value "0x0550" used in the table list 36c is used, for example. From such a value, it is possible to acquire a correspondence between each subtable and a physical page address at which the subtable is stored. Therefore, it is possible to reconstruct the table list 36c by scanning the spare areas of all pages in each of the 8 blocks in which the subtables are stored.

Further, a flag indicating that the subtables, instead of the user data, are stored is described in the spare area of at least the top page of each of the 8 blocks.

Figure 10:
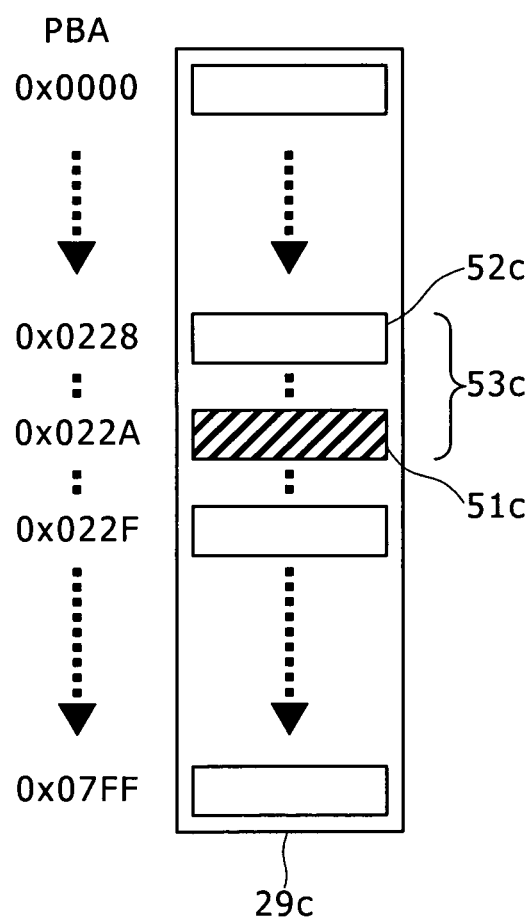
FIG. 10 illustrates a procedure for reconstructing the table after the occurrence of an instantaneous power interruption in the second embodiment.
Figure 11:
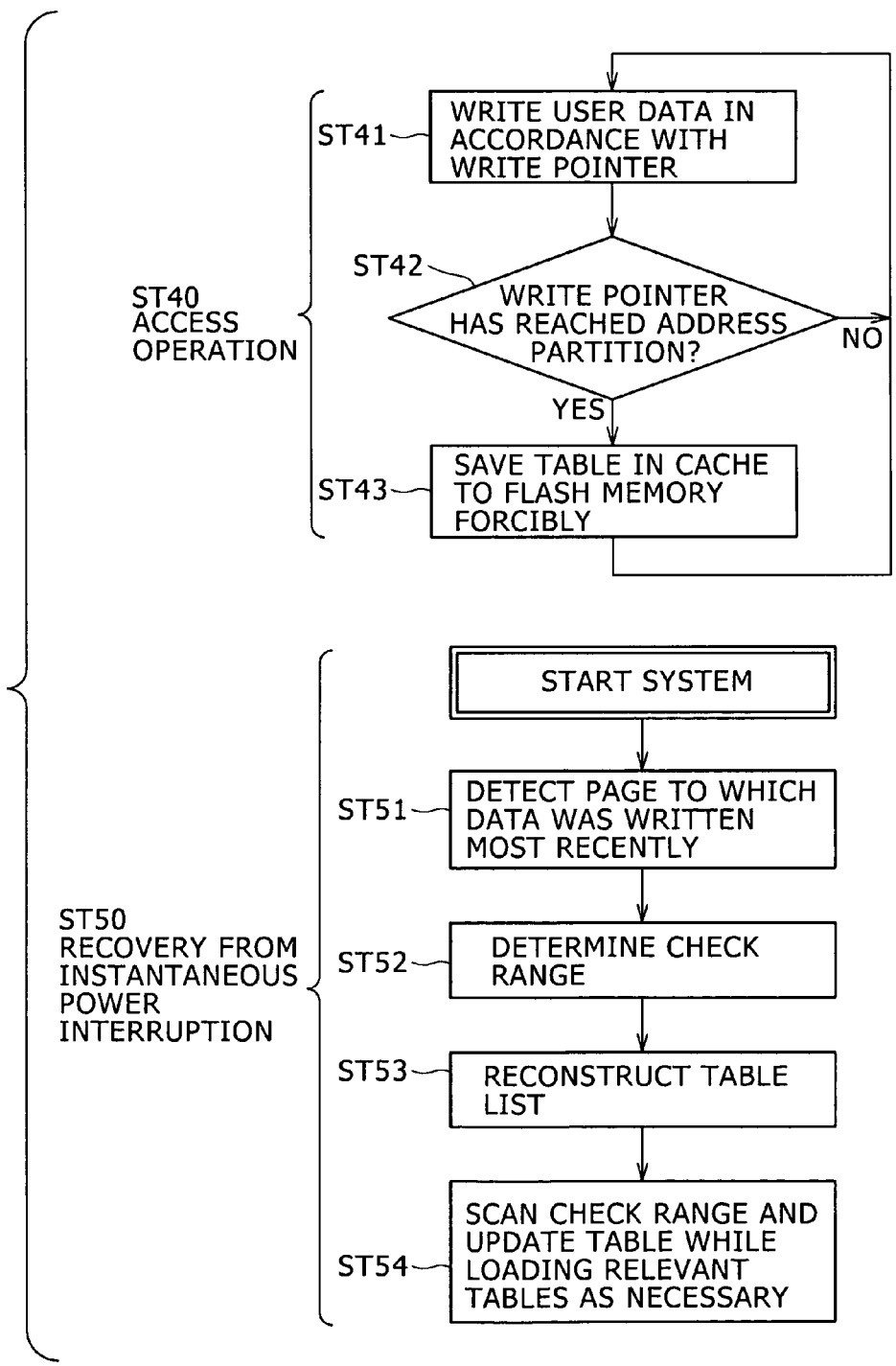
FIG. 11 is a flowchart illustrating the procedure for reconstructing the table after the occurrence of the instantaneous power interruption in the second embodiment.

A procedure of reconstructing the table after the occurrence of the instantaneous power interruption, in the storage apparatus according to the second embodiment, will now be described below in conjunction with a conceptual diagram of FIG. 10 and a flowchart of FIG. 11. The structures of the tables as illustrated in FIG. 8 also are applied here.

Step ST40: Process During Regular Access Operation;

Based on the amount of written user data or the progress of the write pointer 34b, a forced saving of an address translation table 32b stored in the RAM into the flash memory device 29c is performed. This is performed regardless of whether the addition of the aforementioned entry is possible.

Step ST41:

A writing of the user data is performed in accordance with the write pointer 34b. The write pointer 34b scans the physical block addresses PBA within the search table 33b sequentially while searching for an empty block, thereby circulating among the physical page addresses. Here, partitions are provided among the physical block addresses PBA, which range from "0x0000" to "0x07FF", so that each pair of partitions enclose 8 blocks. That is, the partitions are provided on block addresses "0x0000", "0x0008", "0x0010", . . . , "0x07F0", and "0x07F8".

Steps ST42 and ST43:

Here, each time the write pointer reaches one of the partitions, the subtable 37b in the RAM is forcibly saved to the flash memory device 29c. A method of this saving has been described above with reference to FIG. 9.

Note that in the case where the cache has a plurality of entries and a plurality of subtables are registered in the RAM, all of the subtables are forcibly saved.

However, note that if the subtable has not been updated at all since it was loaded into the RAM, the above saving can be omitted.

Step ST50: Recovery from Instantaneous Power Interruption;

Step ST51:

When the system is restarted after the occurrence of the instantaneous power interruption, the spare area of the top page of each block is scanned first. An used block whose top page has the spare area that stores the greatest value of the loop counter and whose address PBA is most rearward can be identified as a block to which data was written most recently. Further, in this block, a page at the highest address of all pages that store data is a page to which data was written most recently.

Step ST52:

Suppose that an address of a block 51c thus identified as the block to which data was written most recently is "0x022A". In this case, it is found that the most recent forced saving of the subtable in the RAM was performed when a write pointer 34c reached a block 52c at "0x0228".

Therefore, pages to which data were newly written after the most recent forced saving of the subtable exist within a block range 53c and not outside of this range. More specifically, a page(s) that exists within this range and whose spare area stores the value of the loop counter equal to the greatest value above can be identified as a page to which data was written after the most recent backup.

Step ST53:

Meanwhile, as a result of the scanning of the spare area of the top page of each block at step ST51, the 8 blocks in which the subtables are stored are identified. All pages in each of the blocks in which the subtables are stored are scanned to acquire the correspondence between each subtable and the physical page address PPA, and the table list 36c is reproduced.

Step ST54:

The spare area of each of the pages within the range 53c is scanned sequentially. A page(s) to which data was written after the forced saving is identified based on the value of the loop counter described in the spare area, and further, based on the value of the logical page address LPA described in the spare area, the correspondence thereof with the physical page address PPA is acquired.

In order to cause this correspondence to be reflected in the subtable stored in the flash memory device, the following process needs to be performed.

First, the table list 36c reproduced at step ST53 is referenced to find the location of the subtable corresponding to the above logical page address. Next, the subtable concerned is loaded from the flash memory device into the RAM, and the subtable is updated to reflect the above address correspondence. Finally, the subtable in the RAM is saved back to the flash memory device. A procedure of saving the subtable at this time follows the above-described procedure.

As a result of repeating the above operation, the latest address translation table is reconstructed.

In order to cause the address correspondence to be reflected in the subtable at step ST54, loading and saving of the subtable need to be performed on a page-by-page basis. This operation needs a time of approximately 400 microseconds.

Compared to the first embodiment, the range 53c, which is scanned for addresses, has a reduced size of a maximum of 8 blocks (2k pages), and a total time for reproducing the address translation table is significantly equal to that in the first embodiment.

Meanwhile, as to the forced saving of the subtable in the second embodiment, a writing to one page is needed every time the write pointer progresses across 8 blocks (2k pages). Even when four subtables are stored in the RAM, a writing to four pages is needed, and the relative increase in overhead is slight.

Therefore, the overhead in the operation of saving the address translation table, which is problematic in the first embodiment, is reduced significantly in the second embodiment. Moreover, the space in the RAM is also significantly reduced.

Note that in the above procedure, the scanning of the subtables is used to reproduce the table list 38c at step ST53. However, when the subtable is forcibly saved at step ST43, a backup of the table list 36c may be saved to the flash memory device after the forced saving of the subtable. In this case, a loading of the backup of the table list is necessary at step ST53, without the need for the scanning of the subtables.

That is, if states of the address translation table and the table list are saved at step ST43, update histories of both the address translation table and the table list from then on to the occurrence of the instantaneous power interruption can be completely reproduced by, in steps ST51 to ST54, identifying the page(s) to which user data was written after the forced saving, and scanning the spare area of such pages sequentially to update the corresponding subtables sequentially.

Note that, at step ST43, the subtable may be saved not in accordance with the progress of the write pointer but in accordance with the amount of user data written to the flash memory. In this case, when the subtable is saved, the location of the write pointer 34c at the time may be stored together in the flash memory, for example. This makes it possible to identify, to a limited degree, the page(s) to which the user data was written after the saving of the subtable. As is the case with the first embodiment, such variations are also possible in the second embodiment.

The foregoing description refers to cases where SUBSTITUTE SPECIFICATION application Ser. No. 12/003,889 various types of control, such as address translation control, are implemented within an independent storage apparatus. However, it is possible that the management of the address translation table and related processes be performed under the control of a host. Such a form is suited in particular to an inexpensive computer system that contains a flash memory. An example of such a computer system is illustrated in FIG. 12.

Figure 12:
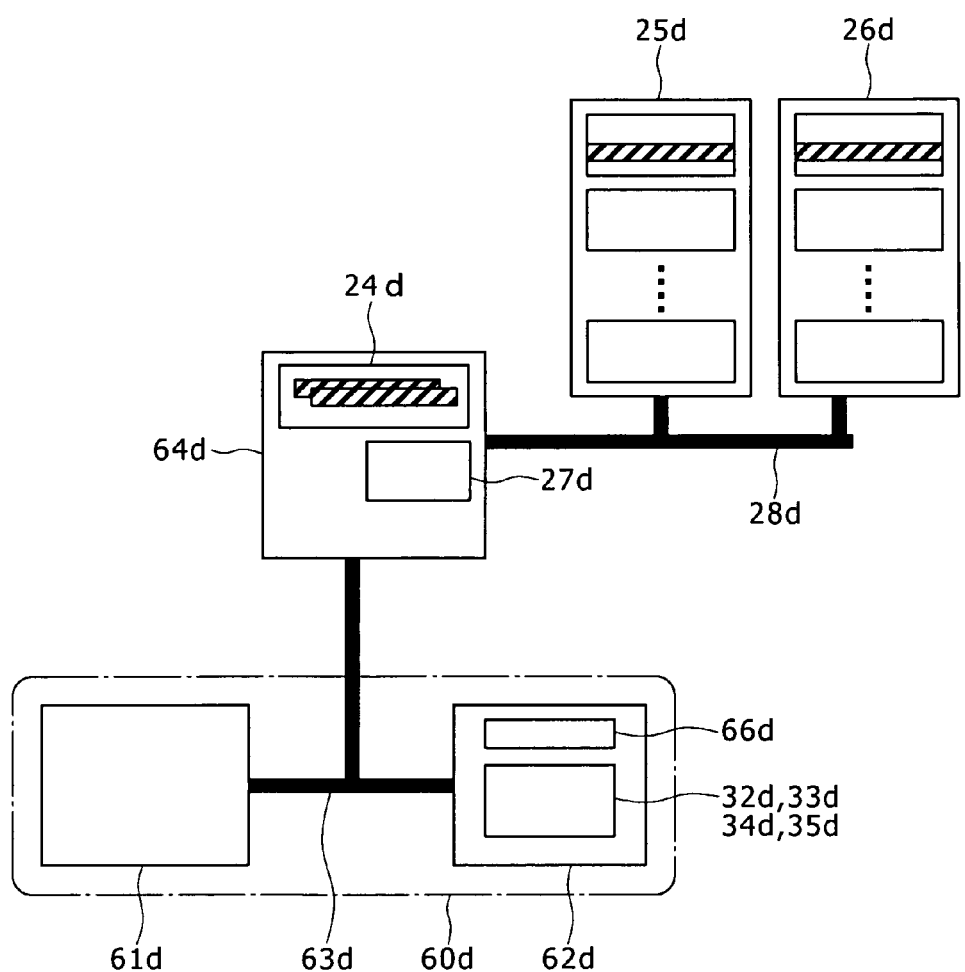
FIG. 12 shows an exemplary structure of a computer system in which the management of the address translation table and related processes are performed under the control of a host.

FIG. 12 shows an exemplary structure of a computer system in which the management of the address translation table and related processes are performed under the control of a host.

In this example, a host system 60d includes a CPU 61d and a system memory 62d.

The CPU 61d is connected to the system memory (RAM) 62d via a 32-bit system bus 63d. In addition, a bridge circuit 64d is connected to the system bus 63d, and a 32-bit data bus 28d is connected to the bridge circuit 64d. Two chips of NAND flash memories 25d and 26d, having 16-bit input/output, are connected in parallel to the data bus 28d. The two chips are accessed concurrently at the time of reading and writing. A page buffer 24d for temporarily storing a page area accessed is contained in the bridge circuit 64d.

The bridge circuit 64d receives various commands from the CPU 61d, and intervenes in the data exchange between the flash memories 25d and 26d and either the CPU 61d or the system memory 62d via the page buffer 24d. Further, the bridge circuit 64d performs, as necessary, error correction on transferred data in accordance with ECC encoding.

Examples of the commands received by the bridge circuit 64d include a command for accessing a specified page in the flash memory 25d or 26d, a command for erasing a specified block in the flash memory, a command for copying a specified page to a specified address, and a command for resetting the flash memory.

Meanwhile, a driver 66d for controlling the above flash storage system resides in the system memory 62d. This driver 66d accepts access to the storage apparatus from an OS or an application, and translates a page address at the time of accessing by referring to an address translation table 32d constructed in the system memory.

At the time of data update, a search table 33d and a write pointer 34d are referenced to determine the address of a page to which updated data is to be written, and a command for writing the updated data to the flash memory is transmitted to the bridge circuit 64d together with the updated data. At the same time, a logical page address before translation is transmitted, and the logical page address is recorded in a spare area of the page to which the updated data is written simultaneously with the writing of the user data.

That is, in the above case, the host system 60d, itself composed of the CPU 61d and the system memory 62d, substitutes in function for the control circuit 22d in FIG. 3, and performs the management of the address translation table and the recovery of invalidated page areas. That is, the driver 66d uses various tables and a pointer, accepts a logical address from the OS or the application, generates a physical address PPA, and transmits a command to the bridge circuit 64d, thereby performing various accesses to the flash memories 25d and 26d.

Note that the address translation table 32d, the search table 33d, and the write pointer 34d used herein are similar to the tables 32 and 33 and the pointer 34 that are illustrated in FIG. 4, for example.

The concepts of the present invention are also applicable to the above system in a similar manner. That is, the driver 66d saves the address translation table 32d constructed within the system memory 62d to the flash memories 25d and 26d as appropriate. When the system is restarted after the occurrence of an instantaneous power interruption, a page(s) to which user data was written after the most recent saving of the table is identified, and information about the subsequent update of the table is acquired from a redundant area of the page(s). A complete reconstruction of the address translation table is achieved by causing the subsequent update to be reflected in the saved address translation table.

It should be understood by those skilled in the art that various modifications, combinations, subcombinations and alterations may occur depending on the designs and other factors insofar as they are within the scope of the appended claims or the equivalents thereof.

What is claimed is:

1. A storage apparatus, comprising:
   a flash memory device as a main memory;
   a second memory configured to store an address translation table; and
   a control section configured to control said flash memory device and said second memory;
   wherein said flash memory device is formed of a plurality of pages, each of the pages having a spare area, data being stored on a page-by-page basis, and
   said control section has
      a function of saving the address translation table within said second memory to said flash memory device when writing or updating of user data reaches a partition point,
      a function of, when writing or updating of the user data is performed in accordance with a command, storing the user data in an appropriate free space within said flash memory device on a page-by-page basis, and, at this time, recording, in the address translation table, a correspondence between a logical page address based on an input address and an address of a page, in said flash memory device, in which the user data is stored, and storing information for identifying the corresponding logical page address in the spare area of the page,
      a function of, when the storage apparatus is started, detecting at least a group of pages to which the user data has been written since the most recent saving of the table, and
      a function of scanning the spare area of each of the group of pages and reproducing a state of the table as updated after the most recent saving of the table to reconstruct the table.

2. The storage apparatus according to claim 1, wherein, when the storage apparatus is started, said control section identifies a range of page addresses in said flash memory device, the range containing all of the group of pages to which the user data has been written since the most recent saving of the table, and scans the spare area of each of pages within this range to reproduce the state of the table as updated after the most recent saving of the table.

3. The storage apparatus according to claim 1, wherein said control section performs the writing of the user data while searching for the free space according to a prescribed order of page addresses, and performs the saving of the address translation table based on a degree to which the writing has progressed.

4. The storage apparatus according to claim 1, wherein said control section performs the writing of the user data in accordance with the progress of a page address pointer stored within the storage apparatus, and performs the saving of the address translation table based on a degree to which the pointer has progressed.

5. The storage apparatus according to claim 1, wherein said control section performs the writing of the user data while searching for the free space according to a prescribed order of page addresses, and, when saving the address translation table, saves information representing a current searching location.

6. The storage apparatus according to claim 1, wherein the address translation table within said second memory is a part of an entire address translation table stored within said flash memory device, the entire address translation table is stored within said flash memory device so as to be divided into a plurality of subtables, and each of the subtables is loaded into said second memory and used as necessary.

7. A computer system, comprising:
   a storage apparatus that includes
      a flash memory device as a main memory,
      a second memory for storing an address translation table, and
      a control section configured to control the flash memory device and the second memory; and
   a host processing apparatus capable of accessing data in the flash memory device;
   wherein the flash memory device is formed of a plurality of pages, each of the pages having a spare area, data being stored on a page-by-page basis, and
   the control section has
      a function of saving the address translation table within the second memory to the flash memory device when writing or updating of user data reaches a partition point,
      a function of, when writing or updating of the user data is performed in accordance with a command from said processing apparatus, storing the user data in an appropriate free space within the flash memory device on a page-by-page basis, and, at this time, recording, in the address translation table, a correspondence between a logical page address based on an address inputted from said processing apparatus and an address of a page, in the flash memory device, in which the user data is stored, and storing information for identifying the corresponding logical page address in the spare area of the page, a function of, when said storage apparatus is started, detecting at least a group of pages to which the user data has been written since the most recent saving of the table, and a function of scanning the spare area of each of the group of pages and reproducing a state of the table as updated after the most recent saving of the table to reconstruct the table.

8. The computer system according to claim 7, wherein, when the system is started, the control section identifies a range of page addresses in the flash memory device, the range containing all of the group of pages to which the user data has been written since the most recent saving of the table, and scans the spare area of each of pages within this range to reproduce the state of the table as updated after the most recent saving of the table.

9. The computer system according to claim 7, wherein the control section performs the writing of the user data while searching for the free space according to a prescribed order of page addresses, and performs the saving of the address translation table based on a degree to which the writing has progressed.

10. The computer system according to claim 7, wherein the control section performs the writing of the user data in accordance with the progress of a page address pointer stored within said storage apparatus, and performs the saving of the address translation table based on a degree to which the pointer has progressed.

11. The computer system according to claim 7, wherein the control section performs the writing of the user data while searching for the free space according to a prescribed order of page addresses, and, when saving the address translation table, saves information representing a current searching location.

12. The computer system according to claim 7, wherein the address translation table within the second memory is a part of an entire address translation table stored within the flash memory device, the entire address translation table is stored within the flash memory device so as to be divided into a plurality of subtables, and each of the subtables is loaded into the second memory and used as necessary.

13. A method for managing a storage apparatus including a flash memory device as a main memory and a second memory for storing an address translation table, the method comprising the steps of:

allowing the flash memory device to be formed of a plurality of pages each having a spare area, data being stored on a page-by-page basis;

when writing user data corresponding to a specific logical page address to the flash memory device, storing the user data in an appropriate free space within the flash memory device on a page-by-page basis;

when storing the user data on a page-by-page basis, recording, in the address translation table, a correspondence between the logical page address and an address of a page, in the flash memory device, in which the user data is stored;

storing information for identifying the corresponding logical page address in the spare area of the page;

saving the address translation table within the second memory to the flash memory device when writing or updating of the user data reaches a partition point;

when a system is started, detecting at least a group of pages to which the user data has been written since the most recent saving of the table; and scanning the spare area of each of the group of pages and reproducing a state of the table as updated after the most recent saving of the table to reconstruct the table.

14. The method for managing the storage apparatus according to claim 13, wherein, when the system is started, a range of page addresses in the flash memory device, the range containing all of the group of pages to which the user data has been written since the most recent saving of the table, is identified, and the spare area of each of pages within this range is scanned to reproduce the state of the table as updated after the most recent saving of the table.

15. The method for managing the storage apparatus according to claim 13, wherein the writing of the user data is performed while searching for the free space according to a prescribed order of page addresses, and the saving of the address translation table is performed based on a degree to which the writing has progressed.

16. The method for managing the storage apparatus according to claim 13, wherein the writing of the user data is performed in accordance with the progress of a page address pointer stored in a random access memory or a register within the system, and the saving of the address translation table is performed based on a degree to which the pointer has progressed.

17. The method for managing the storage apparatus according to claim 13, wherein the writing of the user data is performed while searching for the free space according to a prescribed order of page addresses, and, when saving the address translation table, information representing a current searching location is saved.

18. The method for managing the storage apparatus according to claim 13, wherein the address translation table within the second memory is a part of an entire address translation table stored within the flash memory device, the entire address translation table is stored within the flash memory device so as to be divided into a plurality of subtables, and each of the subtables is loaded into the second memory and used as necessary.

* * * * *